(12) United States Patent
Mason

(10) Patent No.: US 9,545,554 B1
(45) Date of Patent: Jan. 17, 2017

(54) CHEERLEADING STUNT PRACTICE DEVICE

(71) Applicant: Jason C. Mason, Beverly, MA (US)

(72) Inventor: Jason C. Mason, Beverly, MA (US)

(*) Notice: Subject to any disclaimer, the term of this patent is extended or adjusted under 35 U.S.C. 154(b) by 0 days.

(21) Appl. No.: 14/861,287

(22) Filed: Sep. 22, 2015

(51) Int. Cl.
*A63B 21/00* (2006.01)
*A63B 69/00* (2006.01)
*A63B 21/06* (2006.01)
*A63B 23/12* (2006.01)

(52) U.S. Cl.
CPC ........... *A63B 69/00* (2013.01); *A63B 21/0004* (2013.01); *A63B 21/06* (2013.01); *A63B 23/12* (2013.01)

(58) Field of Classification Search
USPC ...................................................... 482/1–148
See application file for complete search history.

(56) References Cited

U.S. PATENT DOCUMENTS

| | | | | |
|---|---|---|---|---|
| 2,715,785 A * | 8/1955 | Pace | ...................... | A63B 25/10 36/7.8 |
| 4,728,103 A * | 3/1988 | Fulton | .................. | A63B 23/085 482/125 |
| 5,125,657 A * | 6/1992 | Beil | ...................... | A63B 53/007 473/293 |
| 5,399,133 A * | 3/1995 | Haber | ................ | A63B 21/4001 482/115 |
| 5,490,823 A * | 2/1996 | Awbrey | ................... | A43B 5/08 482/111 |
| 6,045,462 A * | 4/2000 | Mourek | ............ | A63B 69/0075 473/417 |
| 6,397,498 B1 * | 6/2002 | Yoo | ...................... | A43B 3/0031 36/103 |
| 7,396,319 B1 * | 7/2008 | Ellis | ..................... | A63B 21/155 482/100 |
| 7,703,211 B1 * | 4/2010 | Kirchhoff | ................ | A01G 3/08 30/296.1 |
| 9,079,056 B1 * | 7/2015 | Mcalpin | ................... | A63B 4/00 |
| 9,308,413 B2 * | 4/2016 | Mason | ............ | A63B 23/03525 |

* cited by examiner

Primary Examiner — Stephen Crow
(74) Attorney, Agent, or Firm — Onello & Mello, LLP

(57) ABSTRACT

A practice device for simulating a cheerleading stunt includes a frame that has a base plate and a top plate; a tubular shaft that extends between the base and top plates; a weight that is disposed in the tubular shaft; a spring that is disposed in the tubular shaft and that contacts and biases the weight; a shoe structure; and a mount that supports the shoe structure at one end thereof and that is constructed and arranged to be disposed within the tubular shaft with the spring disposed between the weight and the mount.

20 Claims, 19 Drawing Sheets

CHEERLEADING STUNT PRACTICE DEVICE

FIELD OF THE INVENTION

The present invention relates to a practice device used for simulating a cheerleading stunt. More particularly the present invention pertains to a practice device used for simulating a cheerleading stunt that is relatively simple in construction and that yet provides a realistic feel to the user similar to the experience of a lifting action in performing a cheerleading stunt.

BACKGROUND OF THE INVENTION

Cheerleading stunts may be defined as building performances displaying a person's skill or dexterity. Stunting in cheerleading has been previously referred to as building pyramids. Stunts range from basic two-legged stunts, to one-legged extended stunts, and high flying basket tosses. There are numerous variations of each stunt, multiple entries and dismounts out of the stunt. Stunts vary at each level (level 1-6 according to the USASF). Each level increases the difficulty of the stunt. There are few recognized styles of stunting, coed, all-girl, and hybrid. Cheerleading teams are restricted to specific stunt rules based on the guidelines of certain associations and organizations.

Cheerleading bases are the athletes that hold the flyer or top in the air during the stunt. They are responsible for keeping their flyer in the air, as well as making sure she is safe at all times. Bases are very strong and are usually assigned together based on height to create a level platform for the flyer to perform an action. There are a few recognized styles of stunting: coed, all-girl, and hybrid. There are no gender requirements for a base, both males and females can be bases.

Cheerleading bases have the responsibility of carrying out the stunt and keeping the flyer in the air. The bottom person needs to complete every stunt to the exact way it's supposed to be performed in order for it to work every single time, especially when it needs to count the most in a sports game or a competition. Their most important tool is their legs because they use it to extend cradles and basket tosses higher. Bases at all times should be looking at their flyer in the air because it is their responsibility to hold them up and keep them safe. If at any time the flyer is falling, bases should actively try to stop the flyer from touching the floor so they don't get seriously injured.

The base has the majority of the flyer's foot and the majority of her weight. The main base will be almost directly under the stunt until it is cradled or brought down. In a one leg extension stunt, the main base will lift the toe and heel of the foot to increase stability from moving forwards or backwards. With single base extensions the main base has a grip onto the heel of the flyers foot having a nice and stable transition. The main base is the "powerhouse" of one legged stunts because she/he holds a majority of the weight but keeps their arms somewhat towards the center of the stunt to share the rest of the weight with a possible secondary base. The main base cups the flyers foot from toe to heel, creating a "floor" for the flyers foot and stability.

Presently there is no effective means by which a base can practice his or her lifting techniques which are quite important to the entire routine and the safety of all involved. Accordingly, it is an object of the present invention to provide a practice device used for simulating a cheerleading stunt action, particularly for the practice of a base member of the cheerleading group. This is accomplished by providing a practice device that can be held and rotated to different positions while at the same time giving a feel of actually lifting the cheerleader. Another object of the present invention pertains to a practice device used for simulating a cheerleading stunt that is relatively simple in construction and that yet provides a realistic feel to the user (base) similar to the experience of a lifting action in the actual performance of a cheerleading stunt.

SUMMARY OF THE INVENTION

To accomplish the foregoing and other objects, features and advantages of the present invention there is provided a practice device for simulating a cheerleading stunt comprising: a frame that includes a base plate and a top plate; a tubular shaft that extends between the base and top plates; a weight that is disposed in the tubular shaft; a spring that is disposed in the tubular shaft and that contacts and biases the weight; a shoe structure; and a mount that supports the shoe structure at one end thereof and that is constructed and arranged to be disposed within the tubular shaft with the spring disposed between the weight and the mount.

In accordance with other aspects of the present invention the frame also includes a pair of tubular members that also extend between the base and top plates with the tubular shaft being disposed at an intermediate position of the base and top plates and the respective tubular members being disposed at opposed sides of the base and top plates; including further weights that are each disposed in respective tubular members; wherein the further weights are adjustable as to their position in the tubular member and each include a bumper at each end thereof; including a grasping ball disposed over the top plate of the frame; including at least one additional weight that is arranged over the top plate of the frame, and a support rod for retaining the at least one additional weight and having the grasping ball supported at a top end thereof; and including at least two additional weights stacked against each other.

In accordance with another embodiment of the present invention there is provided a practice device for simulating a cheerleading stunt comprising: a frame that includes a base plate and a top plate; a tubular shaft that extends between the base and top plates; a weight and spring combination that is disposed in the tubular shaft; a shoe structure; a mount that supports the shoe structure from a base end of the tubular shaft; and a grasping ball supported from and disposed over the frame. A user of the practice device has the capability of supporting the practice device overhead by holding in the hand either the grasping ball or the shoe structure.

In accordance with other aspects of the present invention the weight and spring combination is constructed and arranged to be disposed within the tubular shaft with the spring disposed between the weight and the mount; the frame also includes a pair of tubular members that also extend between the base and top plates with the tubular shaft being disposed at an intermediate position of the base and top plates and the respective tubular members being disposed at opposed sides of the base and top plates; including further weights that are each disposed in respective tubular members; wherein the further weights are adjustable as to their position in the tubular member and each include a bumper at each end thereof; including at least one additional weight that is arranged over the top plate of the frame, and a support rod for retaining the at least one additional weight and having the grasping ball supported at a top end thereof; and including at least two additional weights stacked against each other.

In accordance with still another embodiment of the present invention there is provided a method for practicing the simulation of a cheerleading stunt comprising, providing a practice device that includes a frame supporting a grasping ball at one end thereof, supporting a shoe structure at an opposed end thereof and a biased weight disposed adjacent the opposed end of the frame, said practice device being operated by a user to, in one position thereof, engage the grasping ball to lift the practice device, and, in another position, to engage the shoe structure to lift the practice device.

In accordance with other aspects of the present invention the biased weight provides a resistance to simulate the lifting of a cheerleader in performing a cheerleading stunt; including providing the frame with base and top plates and a tubular shaft that is disposed between the base and top plates, the biased weight being constructed and arranged to slide within the tubular shaft to shift the weight distribution in the practice device; and including adding additional weight over the frame.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 21:
FIG. 21 illustrates a base using the practice device of the present invention.

In the drawings there are shown four separate embodiments in respective FIGS. 1-5; 6-10; 11-15; and 16-20. The main portion of each of these devices is substantially the same and thus the same reference numbers are used to identify most of those components. The first embodiment uses a single shoe structure shown at 28. The second embodiment uses a dual shoe structure shown at 28A. The third embodiment shows a pair of shoe structures shown at 38A and 38B. The fourth embodiment is illustrated with a single shoe structure but employing a pair of spaced-apart balls at 50A and 50B. FIG. 21 illustrates the user or base manipulating the first embodiment illustrated in FIGS. 1-5. It is also understood that combinations of these various embodiments may also be employed. For example the embodiment illustrated in FIGS. 1-5 may employ a pair of upper ball members.

The device of the present invention is meant to be used as a practice device for a "base" used in performing cheerleading stunts. The device is particularly meant for practicing the lifting of a cheerleader (flyer) overhead. One purpose of the device is to maintain a proper center line. One can manipulate the device by lifting or tossing the device. In FIG. 21 the base is shown grasping the shoe structure end 15. The user can then flip the device by moving the device downwardly and then upwardly so that it rotates through 180 degrees so that the base then engages the ball end shown at 17 in FIG. 21. This assists a base in perfecting this lifting or tossing action without the use of a "flyer." In addition to rotating the device the throwing action can also include simply throwing the device upwardly and re-engaging the same end of the device (either end).

In cheerleading stunts, it is common for the base to lift the flyer in certain sequences. This requires a rather precise balance by the base. The practice device of the present invention can thus be held and rotated or tossed to different positions while at the same time providing a feel of the actual lifting of the flyer. One of the desired features of the present invention is the provision for one or more weights associated with the practice device. In particular, a center arranged weight (22) is capable of sliding within a middle pole of the device so as to mimic a weight change during a stunt. Also, there are different weight arrangements at opposed top and bottom ends of the practice device and this adds another challenge to the base as the device is flipped from end to end or exchanged at one end. Preferably, more weight is found at one end fo the device than at the other end, as described in the various embodiments illustrated herein.

Figure 1:
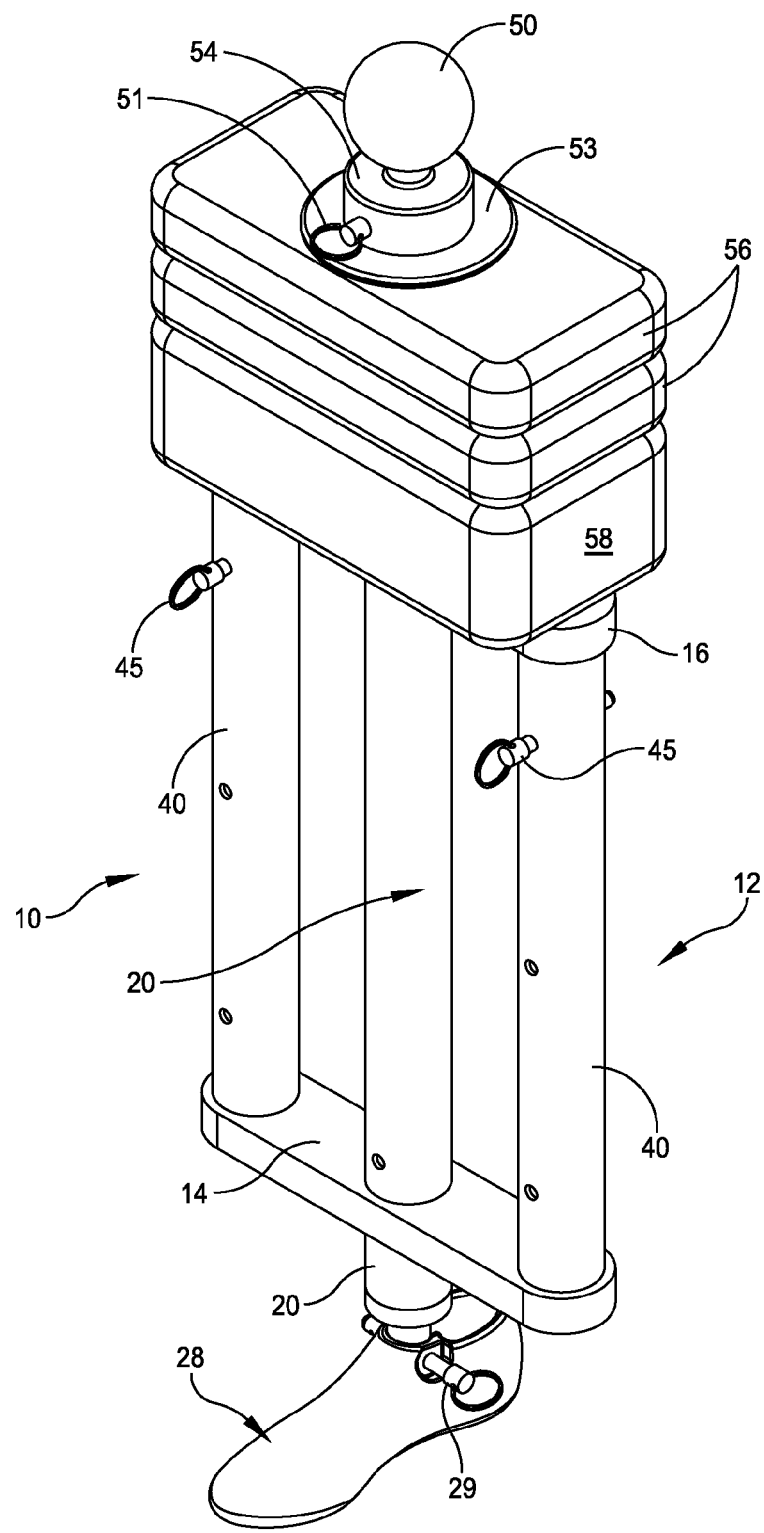
FIG. 1 is a perspective view of the first embodiment of the practice device of the present invention.
Figure 2:
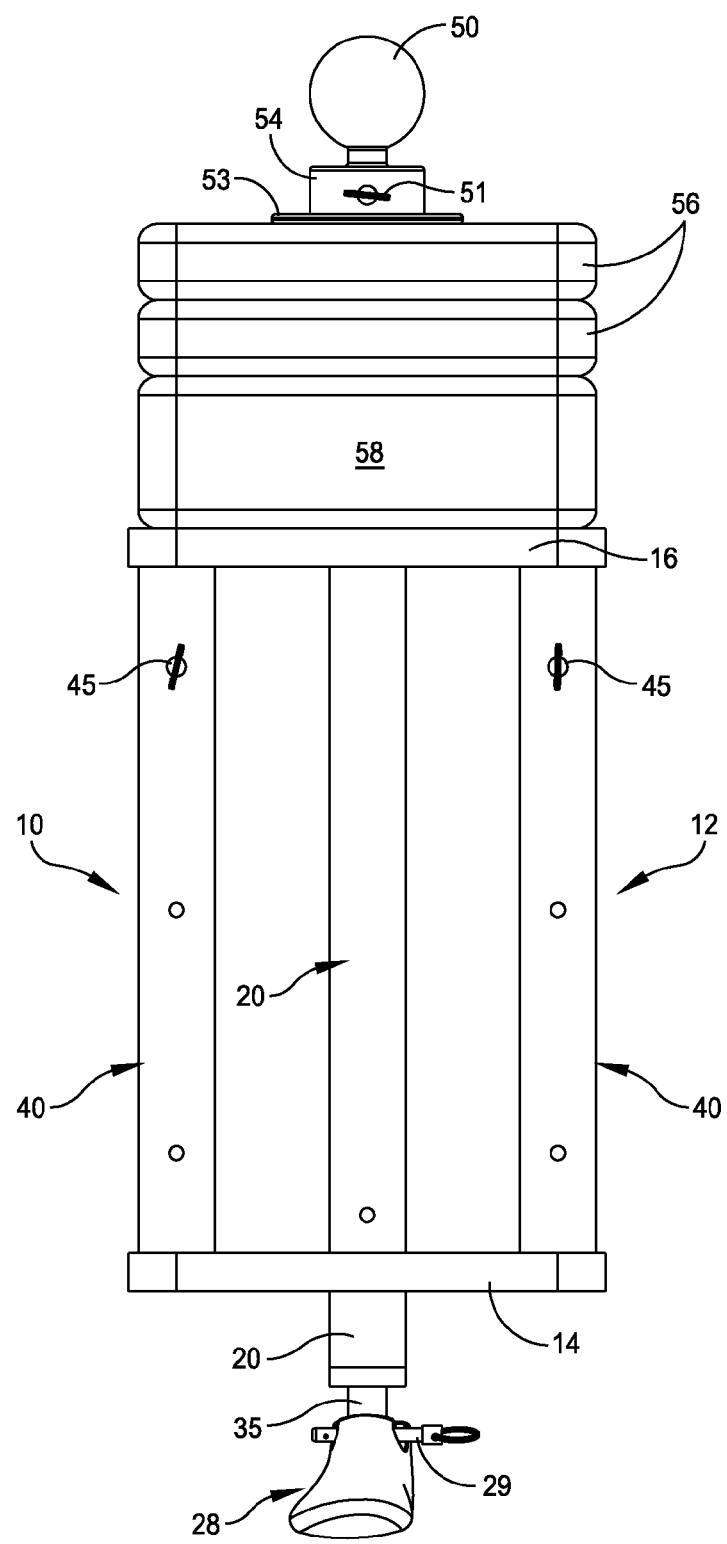
FIG. 2 is a front view of the device illustrated in FIG. 1.
Figure 3:
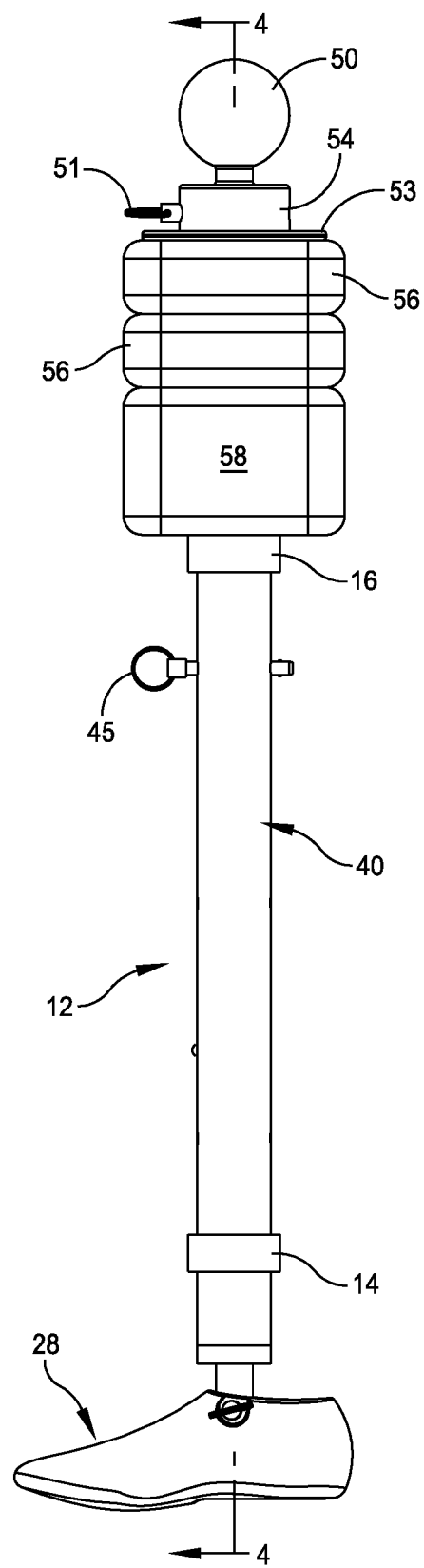
FIG. 3 is a side elevation view of the device illustrated in FIG. 1.
Figure 4:
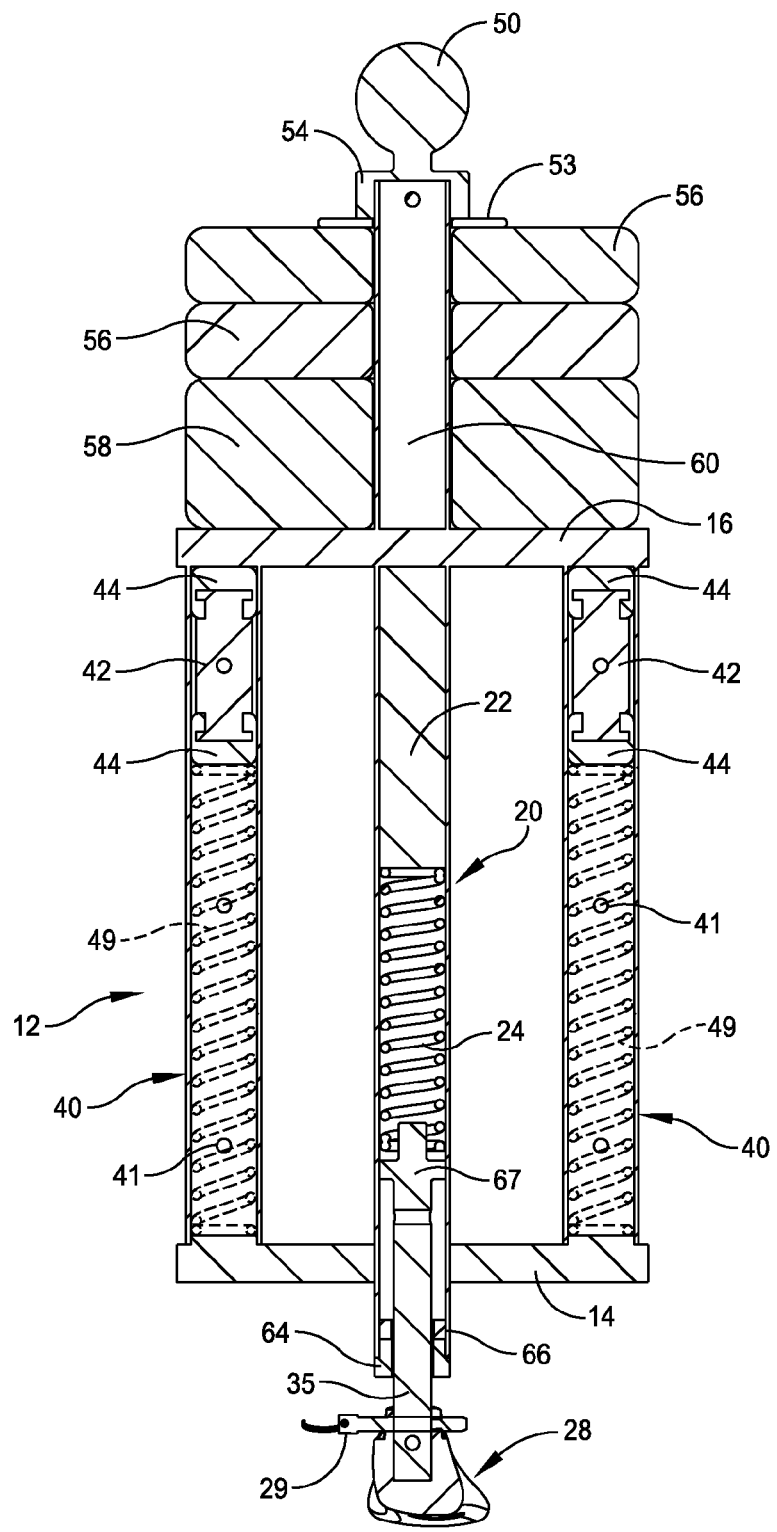
FIG. 4 is a cross-sectional view taken along line 4-4 of FIG. 3.

As indicated previously, there are disclosed herein four different embodiments. However, all of these embodiments have certain common components and in this regard a description is first made of the first embodiment illustrated in FIGS. 1-5. FIG. 1 is a perspective view of the first embodiment of the practice device of the present invention. FIG. 2 is a front view of the device illustrated in FIG. 1. FIG. 3 is a side elevation view of the device illustrated in FIG. 1. FIG. 4 is a cross-sectional view taken along line 4-4 of FIG.

Figure 5:
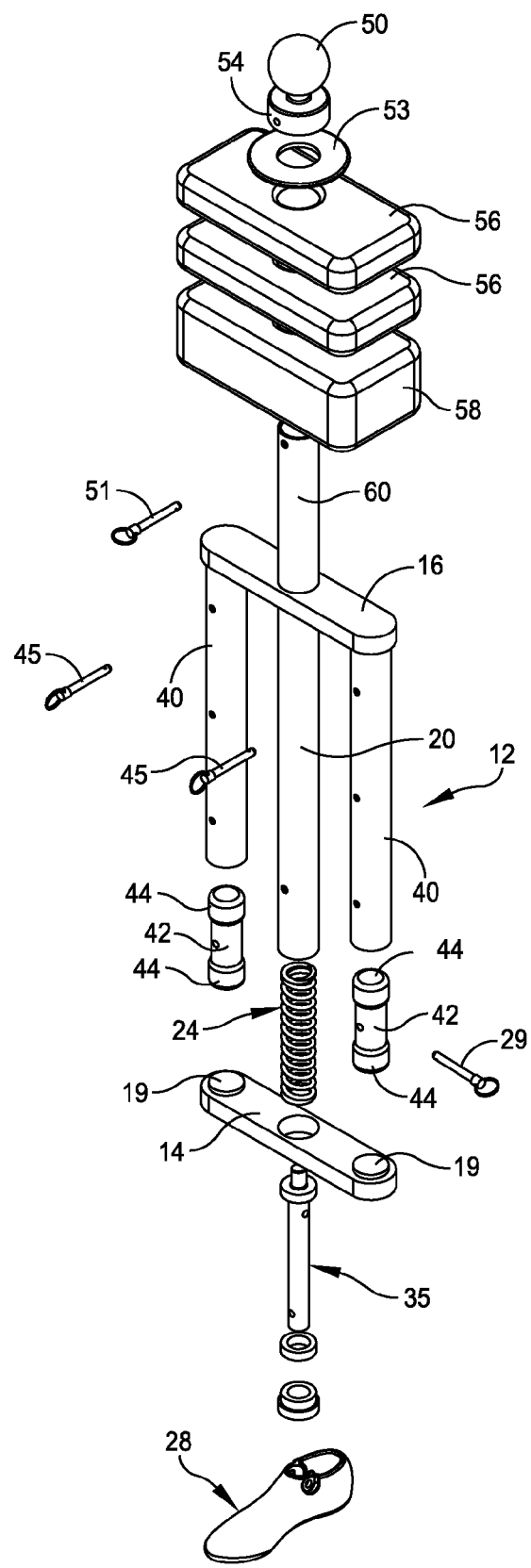
FIG. 5 is an exploded perspective view illustrating the various components of the practice device.

3. FIG. 5 is an exploded perspective view illustrating the various components of the practice device.

In FIGS. 1-5, there is illustrated a practice device useful in simulating a cheerleading stunt, particularly for use by the "base" member. This device 10 comprises a frame 12 that includes a base plate 14 and a top plate 16. FIGS. 1-4 illustrate these plates and the exploded perspective view of FIG. 5 also provides an illustration of the construction of these plates 14, 16. A tubular shaft 20 extends between the plates 14 and 16. As illustrated in FIG. 4, this tubular shaft extends below the plate 14 and may terminate at the plate 16. The tubular shaft 20 is secured to both plates 14 and 16.

In this first embodiment there is also illustrated a weight 22 that is disposed within the tubular shaft 20. Also disposed within the tubular shaft 20 is a spring 24. Refer to the cross-sectional view of FIG. 4 and the exploded perspective view of FIG. 5 in connection with the tubular shaft 20, the weight 22, and the coil spring 24. The top end of the coil spring 24 rests against the bottom end of the weight 22. At the bottom end of the device as illustrated in FIG. 4, there is a shoe structure shown at 28. This shoe structure may be of a texture and resiliency similar to the shoes or sneakers worn by a flyer. FIG. 4 illustrates the shoe structure 28 attached by means of the pin 29 to the bottom end of a mount 35. The mount 35 is received within the bottom end of the tubular shaft 24 and is delimited by means of a bottom cap 64. Over the bottom cap 64 there is provided a bumper 66 that limits a particular flange 67 at the top end of the mount 35. This flange 67 engages the bottom end of the coil spring 24. By the base grasping the shoe structure 28, such as illustrated in FIG. 21, the entire practice device can be thrown overhead to simulate a throwing action of the flyer. The shoe structure 28 may be re-engaged or the entire practice device may be rotated through 180 degrees and re-grasped at the ball end 17. In either case, the lifting action causes a shifting of the weight 22 inside the tubular shaft 20 so as to mimic a weight change that occurs normally during a stunt lifting action.

The frame 12 also may be considered as including a pair of tubular members 40 that also extend between the base plate 14 and the top plate 16. As illustrated in FIG. 5, the base plate 14 may be provided with a pair of small studs 19 that accommodate the bottom end of each of the tubular members 40. The tubular shaft 20 is disposed at an intermediate position of the base and top plates and the respective tubular members 40 are disposed at opposed sides of the base and top plates, spaced from the center tubular shaft. In the cross-sectional view of FIG. 4 a further weight 42 is disposed in each of the tubular members 40. Each of the tubular members 40 has spaced apart holes 41 for accommodating a securing pin 45. These pins 45 are clearly illustrated in FIGS. 1-3. The pins 45 retain each of the weights 42 in place. Each of the weights 42 may be provided with end bumpers 44 as illustrated in FIGS. 4 and 5. In an alternate embodiment of the present invention, instead of having securing pins, one may provide respective coil springs illustrated in FIG. 4 in phantom at 49. This would provide an arrangement with at least three separate weights to provide an enhanced weight shifting. Also, in FIG. 4 because there are different sets of holes 41, in still another embodiment, the weights 42 may be disposed at different positions along the tubular members 40, or still further weights 42 may be inserted in the tubular shaft 20 and secured by respective pins 45.

As indicated previously, there is also a ball end 17 of the practice device. This is illustrated in, for example, FIG. 4, by the ball 50 that includes a support base 54. The ball 50 is supported at the top end of a support rod 60. The support rod 60 may be appropriately secured to the top plate 16. The support rod 60 includes a top hole for receiving a securing pin 51 for maintaining the ball 50 in place at the top of the practice device. FIGS. 4 and 5 also illustrate a pair of weights at 56 and a spacer at 58. The pair of weights is disposed over the spacer 58 and both the weights and the spacer are secured about the support rod 60. From the position of FIG. 4, this provides a top-heavy structure which is desirous. A washer 53 is disposed between the top plate 16 and the weight 56.

Figure 6:
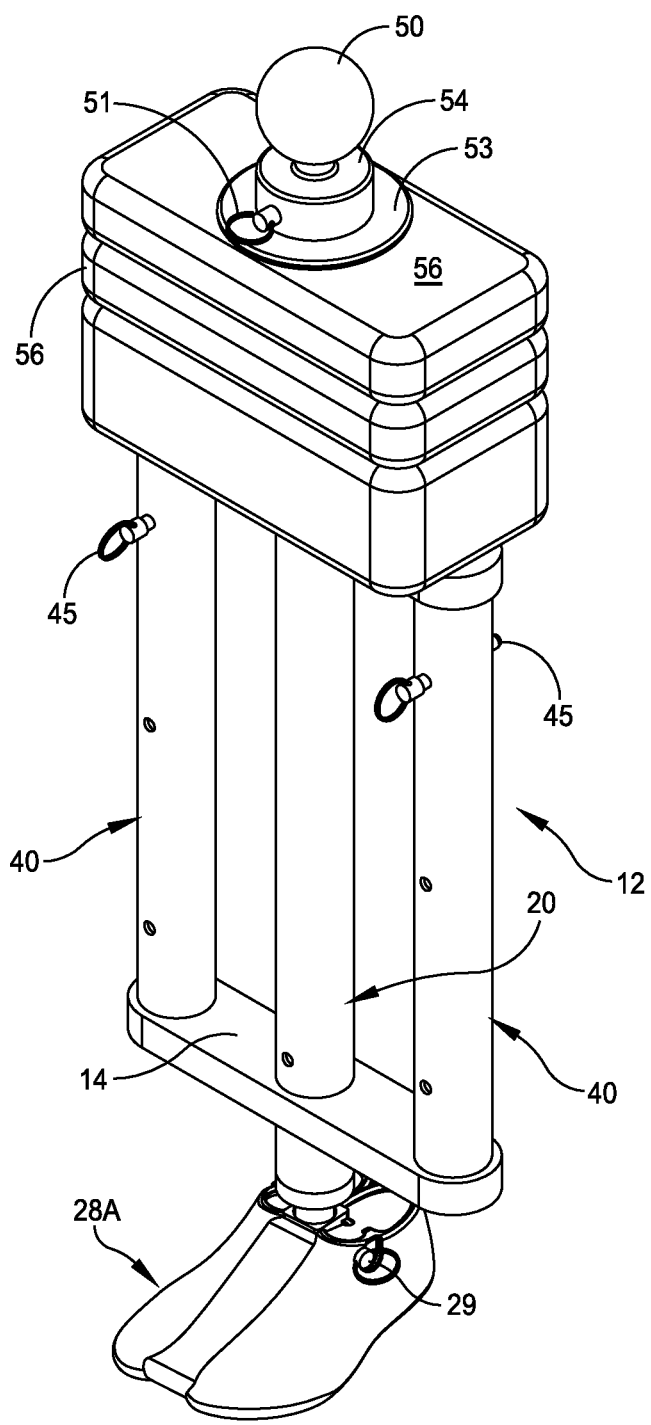
FIG. 6 is a perspective view of the second embodiment of the invention employing a double shoe construction.
Figure 7:
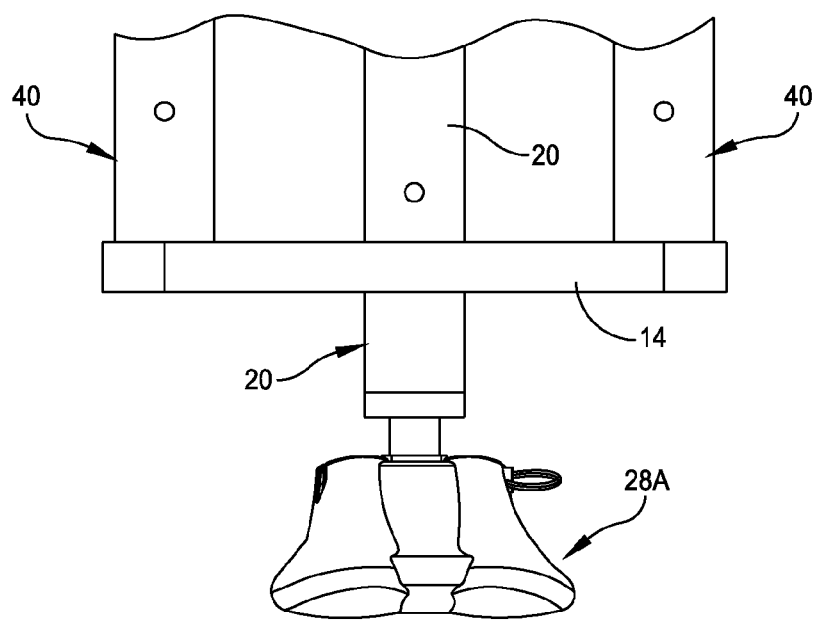
FIG. 7 is a partial front view of the device of FIG. 6.
Figure 8:
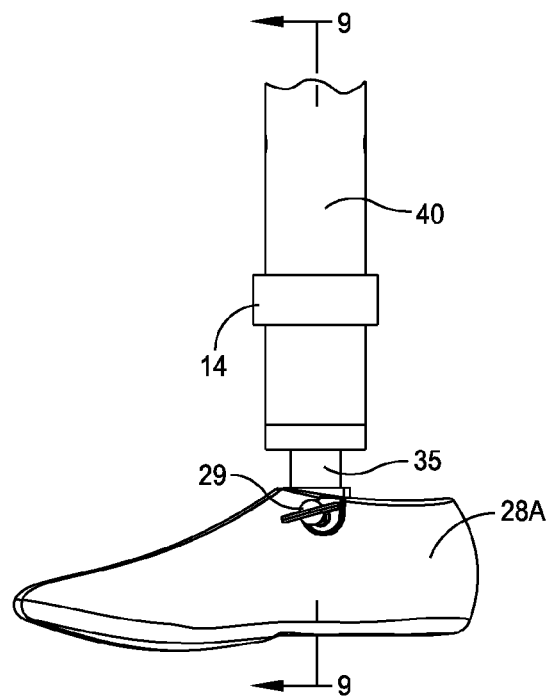
FIG. 8 is a partial side elevation view of the device of FIG. 6.
Figure 9:
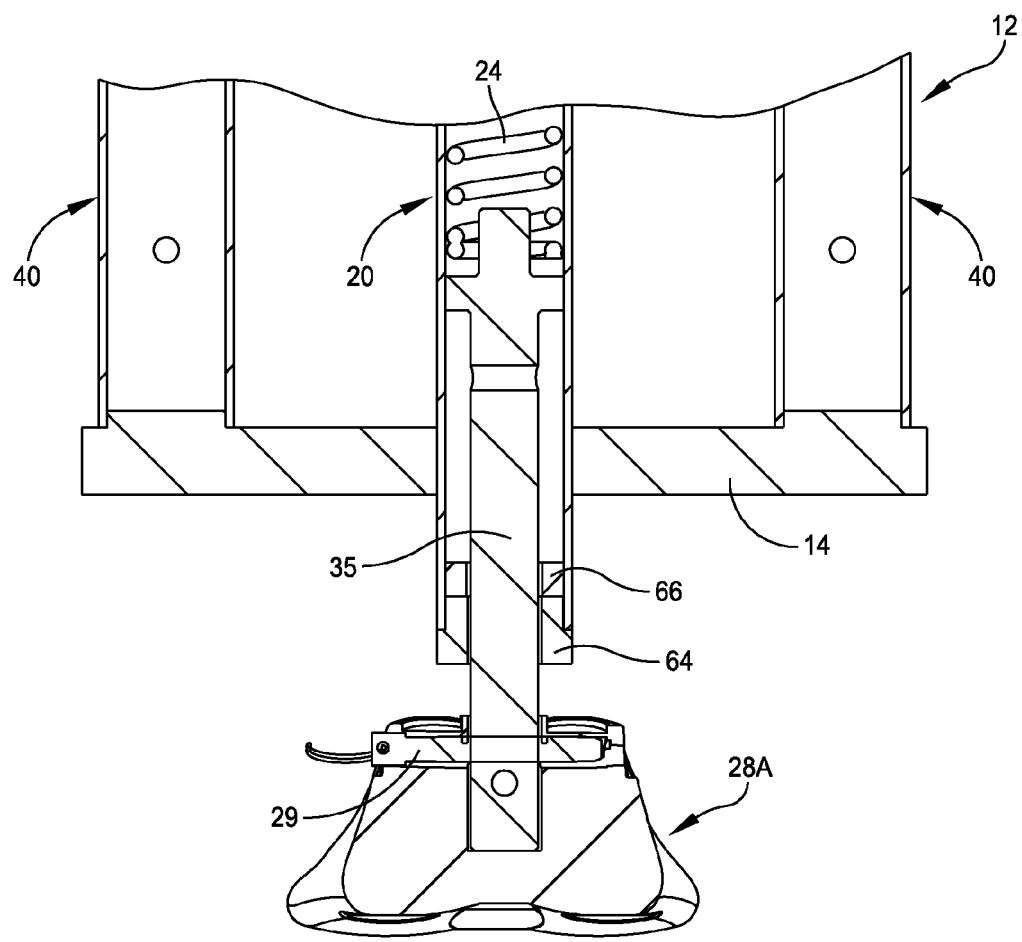
FIG. 9 is a cross-sectional view taken along line 9-9 of FIG. 8.
Figure 10:
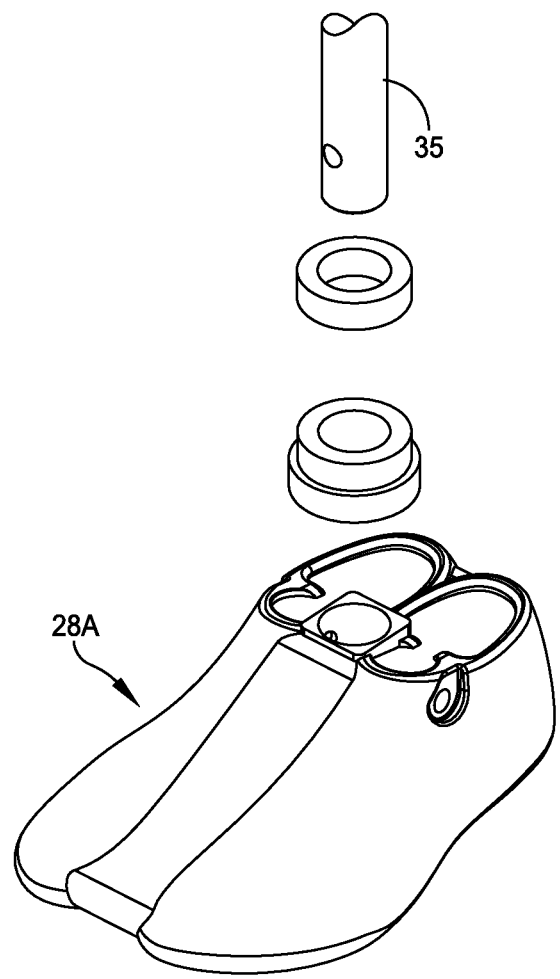
FIG. 10 is a perspective view at the double shoe end of the device of FIG. 6.

A second embodiment of the present invention is illustrated in FIGS. 6-10. FIG. 6 is a perspective view of the second embodiment of the invention employing a double shoe construction. FIG. 7 is a partial front view of the device of FIG. 6. FIG. 8 is a partial side elevation view of the device of FIG. 6. FIG. 9 is a cross-sectional view taken along line 9-9 of FIG. 8. FIG. 10 is a perspective view at the double shoe end of the device of FIG. 6.

In FIGS. 6-10, there is illustrated a practice device useful in simulating a cheerleading stunt, particularly for use by the "base" member. This device 10 comprises a frame 12 that includes a base plate 14 and a top plate 16. FIGS. 6-8 illustrate these plates and the exploded perspective view of FIG. 5 also provides an illustration of the construction of these plates 14, 16. A tubular shaft 20 extends between the plates 14 and 16. As illustrated in FIGS. 4, 6 and 9, this tubular shaft extends below the plate 14 and may terminate at the plate 16. The tubular shaft 20 is secured to both plates 14 and 16.

In this second embodiment there is also illustrated a weight 22 that is disposed within the tubular shaft 20. Also disposed within the tubular shaft 20 is a spring 24. Refer to the cross-sectional view of FIG. 4 and the exploded perspective view of FIG. 5 in connection with the tubular shaft 20, the weight 22, and the coil spring 24. The top end of the coil spring 24 rests against the bottom end of the weight 22. At the bottom end of the device as illustrated in FIGS. 6, 9 and 10, there is a shoe structure shown at 28A. This shoe structure may be of a texture and resiliency similar to the shoes or sneakers worn by a flyer. In this embodiment the shoe structure 28A is a double shoe construction to mimic a pair of shoes of a flyer which are typically held close together in performing a stunt.

FIGS. 6-9 illustrate the shoe structure 28A attached by means of the pin 29 to the bottom end of a mount 35. The mount 35 is received within the bottom end of the tubular shaft 24 and is delimited by means of a bottom cap 64. Over the bottom cap 64 there is provided a bumper 66 that limits a particular flange 67 at the top end of the mount 35. This flange 67 engages the bottom end of the coil spring 24. By the "base" grasping the shoe structure 28A, such as illustrated in FIG. 21, the entire practice device can be thrown overhead to simulate a throwing action of the flyer. The shoe structure 28A may be re-engaged or the entire practice device may be rotated through 180 degrees and re-grasped at the ball end 17. In either case, the lifting action causes a shifting of the weight 22 inside the tubular shaft 20 so as to mimic a weight change that occurs normally during a stunt lifting action.

The frame 12 also may be considered as including a pair of tubular members 40 that also extend between the base plate 14 and the top plate 16. As illustrated in FIG. 5, the base plate 14 may be provided with a pair of small studs 19 that accommodate the bottom end of each of the tubular members 40. The tubular shaft 20 is disposed at an intermediate position of the base and top plates and the respective tubular members 40 are disposed at opposed sides of the base and top plates, spaced from the center tubular shaft. In the cross-sectional view of FIG. 4 a further weight 42 is disposed in each of the tubular members 40. Each of the tubular members 40 has spaced apart holes 41 for accommodating a securing pin 45. These pins 45 are clearly illustrated in FIGS. 1-3. The pins 45 retain each of the weights 42 in place. Each of the weights 42 may be provided with end bumpers 44 as illustrated in FIGS. 4 and 5. In an alternate embodiment of the present invention, instead of having securing pins, one may provide respective coil springs illustrated in FIG. 4 in phantom at 49. This would provide an arrangement with at least three separate weights to provide an enhanced weight shifting. Also, in FIG. 4 because there are different sets of holes 41, in still another embodiment, the weights 42 may be disposed at different positions along the tubular members 40, or still further weights 42 may be inserted in the tubular shaft 20 and secured by respective pins 45. In this second embodiment the same structure of the frame and tubular members, along with the weights, may be employed as in the first embodiment.

As indicated previously, there is also a ball end 17 of the practice device. This is illustrated in, for example, FIG. 6, by the ball 50 that includes a support base 54. The ball 50 is supported at the top end of a support rod 60. The support rod 60 may be appropriately secured to the top plate 16. The support rod 60 includes a top hole for receiving a securing pin 51 for maintaining the ball 50 in place at the top of the practice device. FIG. 6 also illustrates a pair of weights at 56 and a spacer at 58. The pair of weights is disposed over the spacer 58 and both the weights and the spacer are secured about the support rod 60. From the position of FIG. 6, this provides a top-heavy structure which is desirous. A washer 53 is disposed between the top plate 16 and the weight 56.

Figure 11:
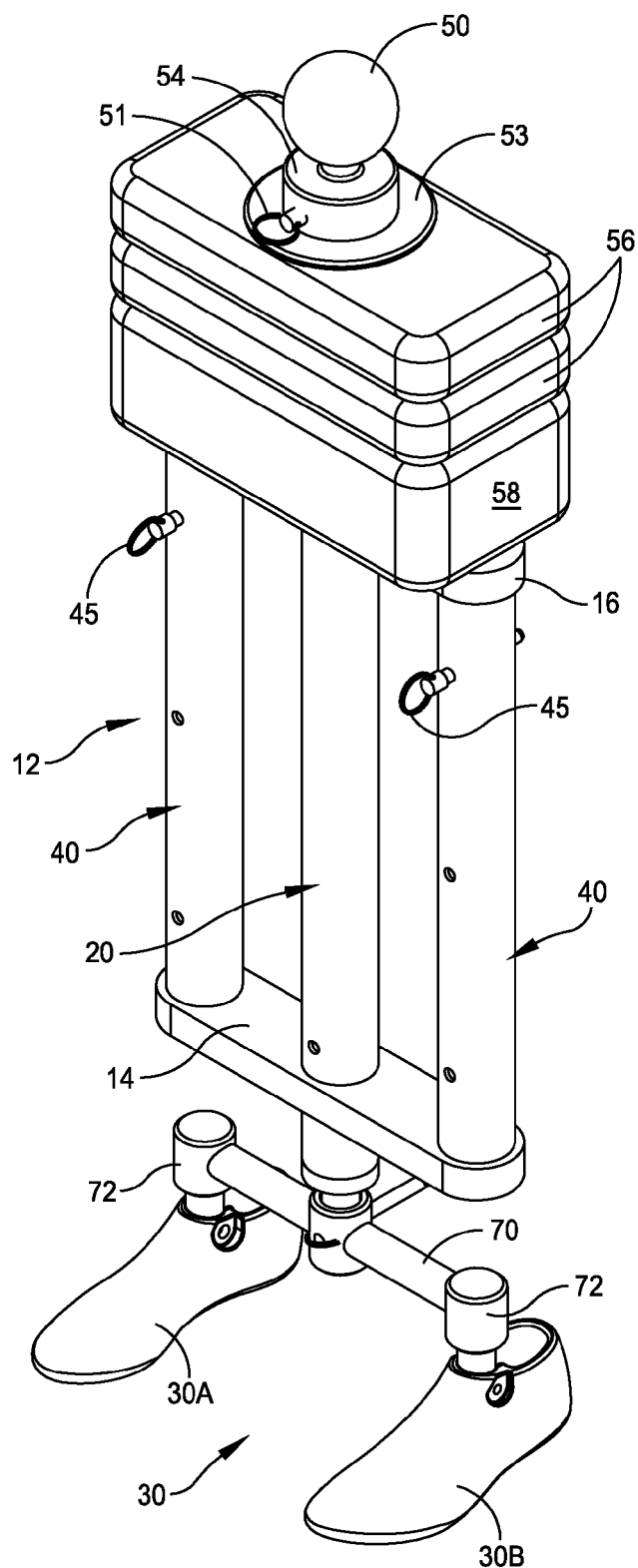
FIG. 11 is a perspective view of a third embodiment of the present invention employing two separate shoe structures.
Figure 12:
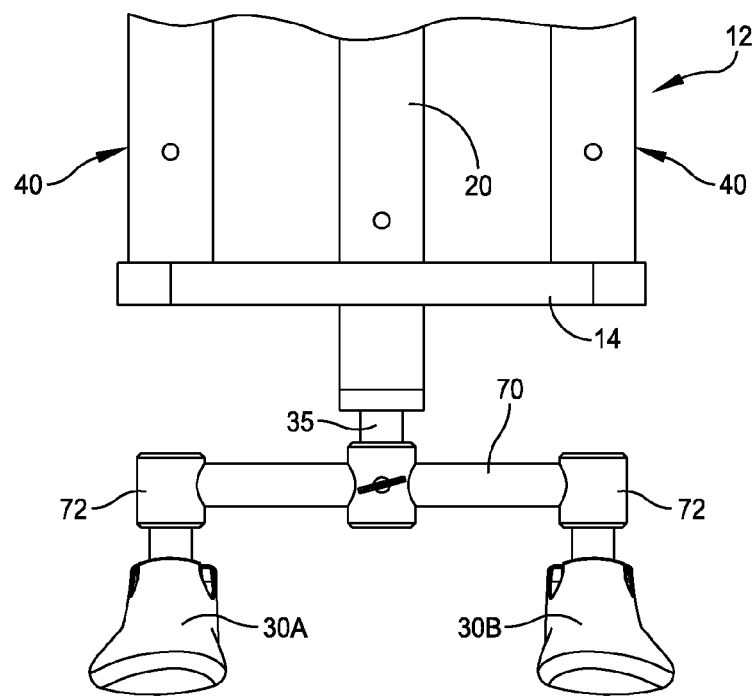
FIG. 12 is a fragmentary front view of the device of FIG. 11.
Figure 13:
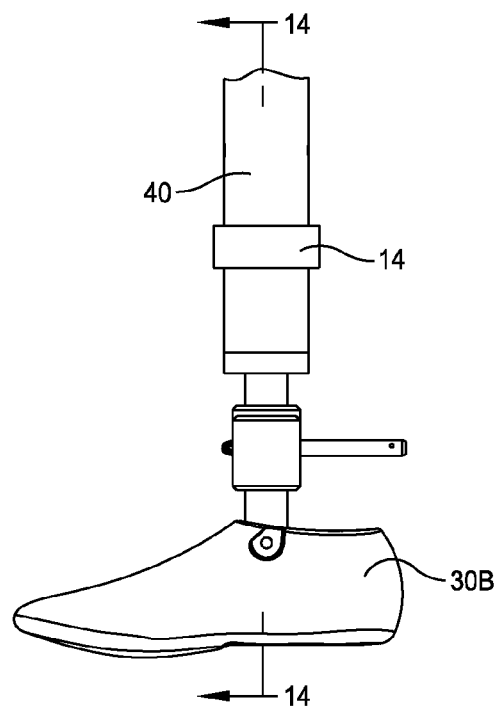
FIG. 13 is a fragmentary side elevation view of the device of FIG. 11.
Figure 14:
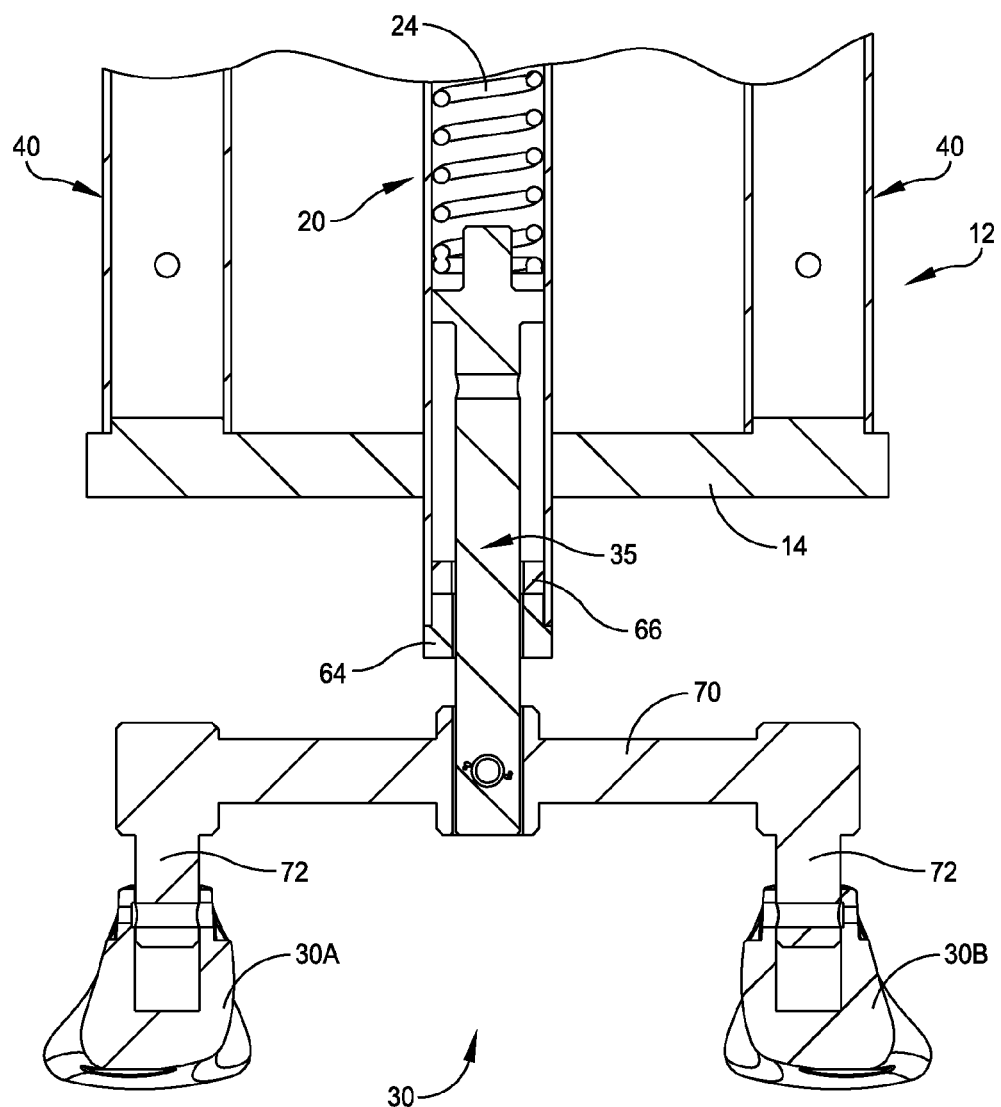
FIG. 14 is a cross-sectional view taken along line 14-14 of FIG. 13.
Figure 15:
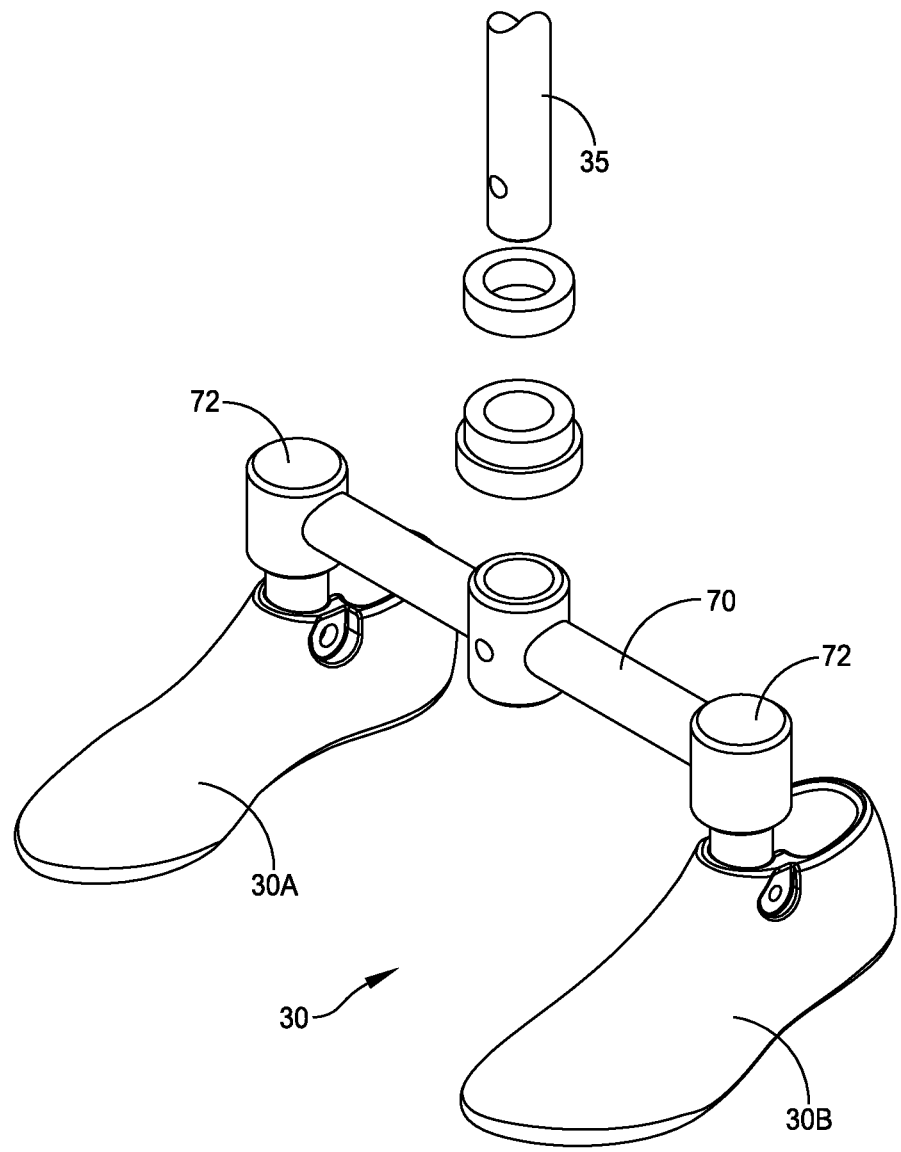
FIG. 15 is a perspective view showing the shoe construction.

A third embodiment of the present invention is illustrated in FIGS. 11-15. FIG. 11 is a perspective view of a third embodiment of the present invention employing two separate shoe structures. FIG. 12 is a fragmentary front view of the device of FIG. 11. FIG. 13 is a fragmentary side elevation view of the device of FIG. 11. FIG. 14 is a cross-sectional view taken along line 14-14 of FIG. 13. FIG. 15 is a perspective view showing the shoe construction.

In FIGS. 11-15, there is illustrated a practice device useful in simulating a cheerleading stunt, particularly for use by the "base" member. This device 10 comprises a frame 12 that includes a base plate 14 and a top plate 16. FIG. 11 illustrates these plates and the exploded perspective view of FIG. 5 also provides an illustration of the construction of these plates 14, 16. A tubular shaft 20 extends between the plates 14 and 16. As illustrated in FIGS. 4 and 11, this tubular shaft extends below the plate 14 and may terminate at the plate 16. The tubular shaft 20 is secured to both plates 14 and 16.

In this third embodiment there is also illustrated a weight 22 that is disposed within the tubular shaft 20. Also disposed within the tubular shaft 20 is a spring 24. Refer to the cross-sectional view of FIG. 4 and the exploded perspective view of FIG. 5 in connection with the tubular shaft 20, the weight 22, and the coil spring 24. The top end of the coil spring 24 rests against the bottom end of the weight 22. At the bottom end of the device as illustrated in FIGS. 11, 14 and 15, there is a double shoe structure shown at 30A, 30B. This shoe structure may be of a texture and resiliency similar to the shoes or sneakers worn by a flyer. In this embodiment the shoe structure 30A, 30B is a double shoe construction to mimic a pair of shoes of a flyer which are typically held somewhat apart in performing a stunt. The shoe structure includes a cross bar 70 and end posts 72 that support respective shows 30A and 30B.

FIGS. 11-15 illustrate the shoe structure attached by means of the respective pins (not shown but the same as in earlier embodiments) to the bottom end of a mount 35. The mount 35 is received within the bottom end of the tubular shaft 24 and is delimited by means of a bottom cap 64. Over the bottom cap 64 there is provided a bumper 66 that limits a particular flange 67 at the top end of the mount 35. This flange 67 engages the bottom end of the coil spring 24. By the "base" grasping the shoe structure 28A, such as illustrated in FIG. 21, the entire practice device can be thrown overhead to simulate a throwing action of the flyer. The shoe structure 30A, 30B may be re-engaged or the entire practice device may be rotated through 180 degrees and re-grasped at the ball end 17. In either case, the lifting action causes a shifting of the weight 22 inside the tubular shaft 20 so as to mimic a weight change that occurs normally during a stunt lifting action.

The frame 12 also may be considered as including a pair of tubular members 40 that also extend between the base plate 14 and the top plate 16. As illustrated in FIG. 5, the base plate 14 may be provided with a pair of small studs 19 that accommodate the bottom end of each of the tubular members 40. The tubular shaft 20 is disposed at an intermediate position of the base and top plates and the respective tubular members 40 are disposed at opposed sides of the base and top plates, spaced from the center tubular shaft. In the cross-sectional view of FIG. 4 a further weight 42 is disposed in each of the tubular members 40. Each of the tubular members 40 has spaced apart holes 41 for accommodating a securing pin 45. These pins 45 are clearly illustrated in FIGS. 1-3. The pins 45 retain each of the weights 42 in place. Each of the weights 42 may be provided with end bumpers 44 as illustrated in FIGS. 4 and 5. In an alternate embodiment of the present invention, instead of having securing pins, one may provide respective coil springs illustrated in FIG. 4 in phantom at 49. This would provide an arrangement with at least three separate weights to provide an enhanced weight shifting. Also, in FIG. 4 because there are different sets of holes 41, in still another embodiment, the weights 42 may be disposed at different positions along the tubular members 40, or still further weights 42 may be inserted in the tubular shaft 20 and secured by respective pins 45. In this third embodiment the same structure of the frame and tubular members, along with the weights, may be employed as in the first embodiment.

As indicated previously, there is also a ball end 17 of the practice device. This is illustrated in, for example, FIG. 11, by the ball 50 that includes a support base 54. The ball 50 is supported at the top end of a support rod 60. The support rod 60 may be apprpriately secured to the top plate 16. The support rod 60 includes a top hole for receiving a securing pin 51 for maintaining the ball 50 in place at the top of the practice device. FIG. 11 also illustrate a pair of weights at 56 and a spacer at 58. The pair of weights is disposed over the spacer 58 and both the weights and the spacer are secured about the support rod 60. From the position of FIG. 11, this provides a top-heavy structure which is desirous. A washer 53 is disposed between the top plate 16 and the weight 56.

Figure 16:
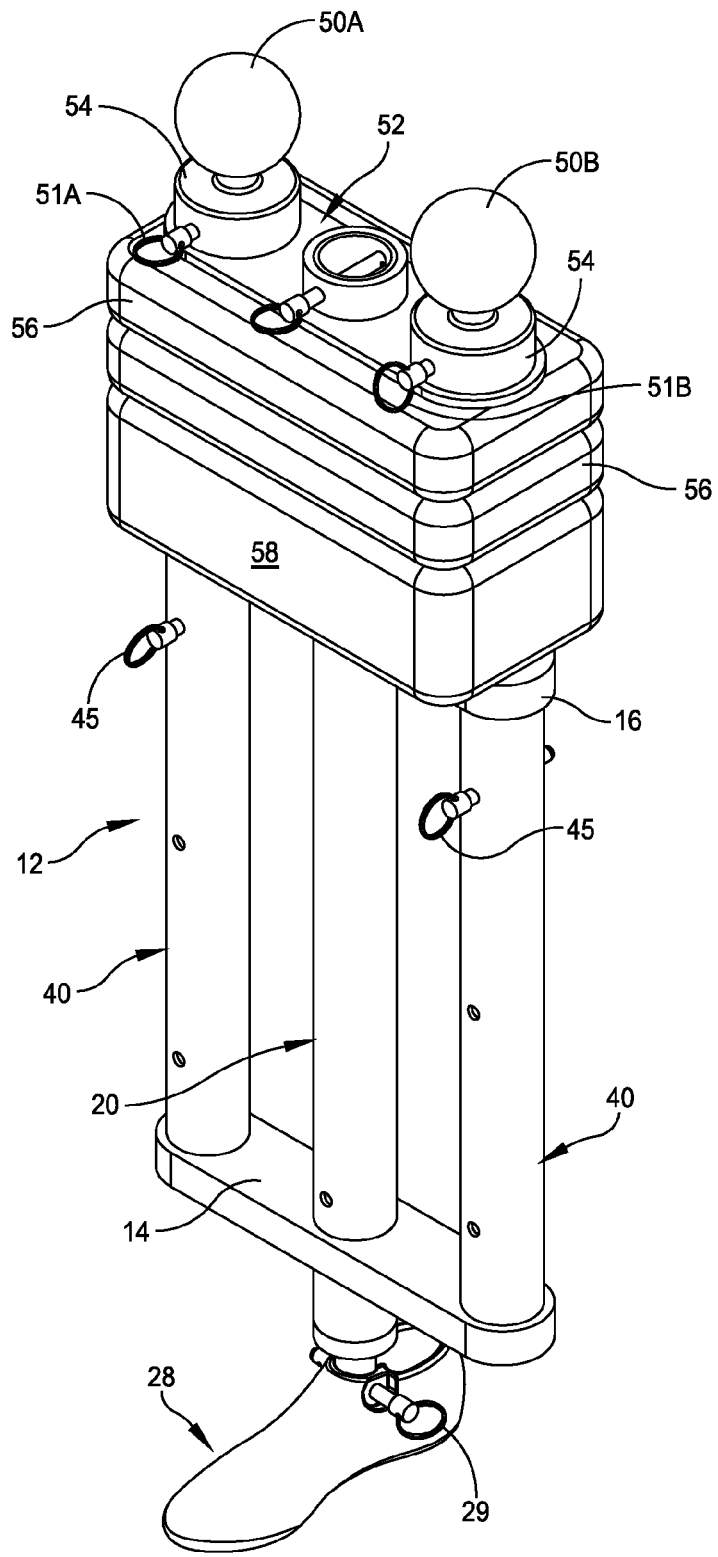
FIG. 16 is a perspective view of a fourth embodiment of the present invention employing a pair of balls.
Figure 17:
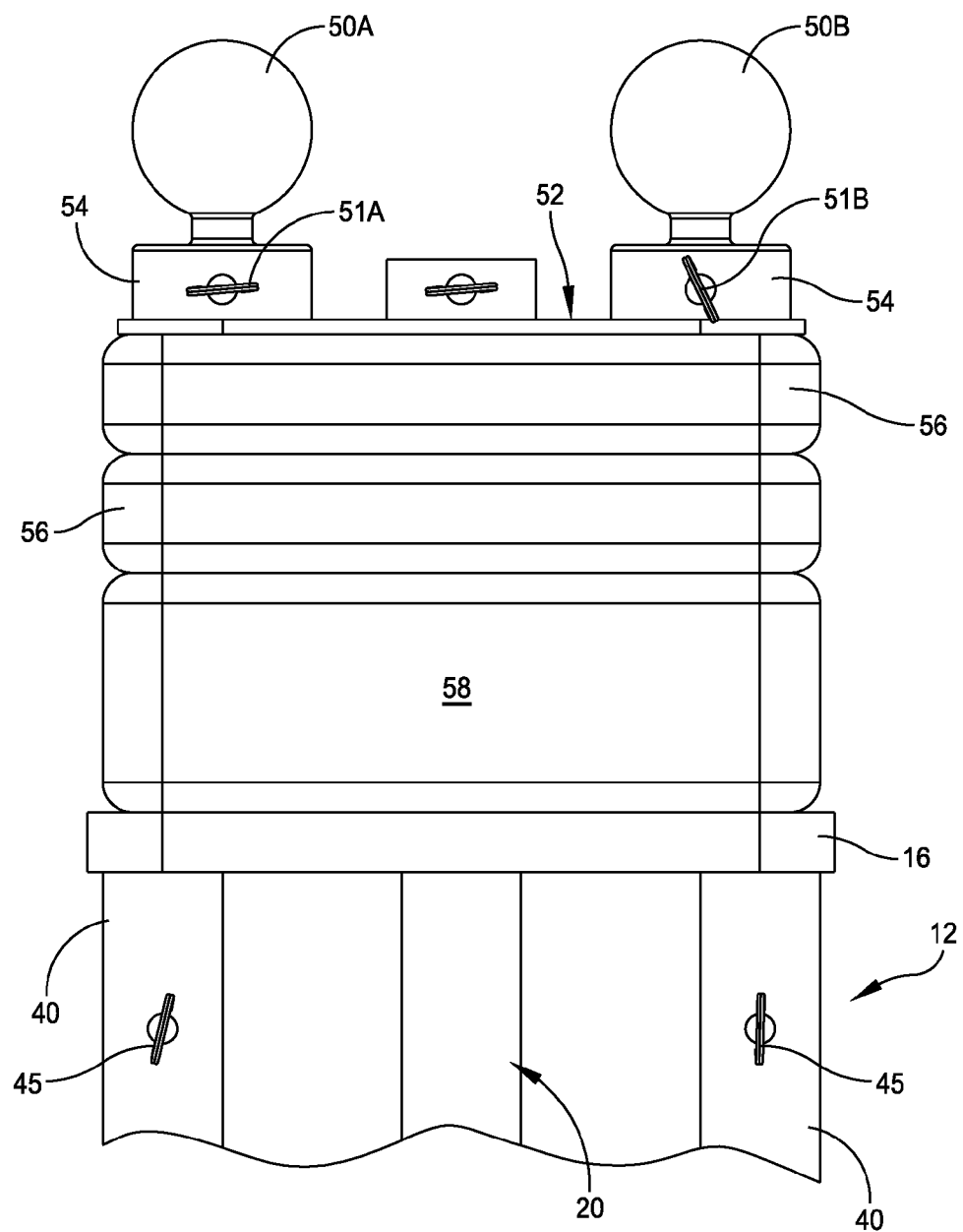
FIG. 17 is a fragmentary front view of the device of FIG. 16.
Figure 18:
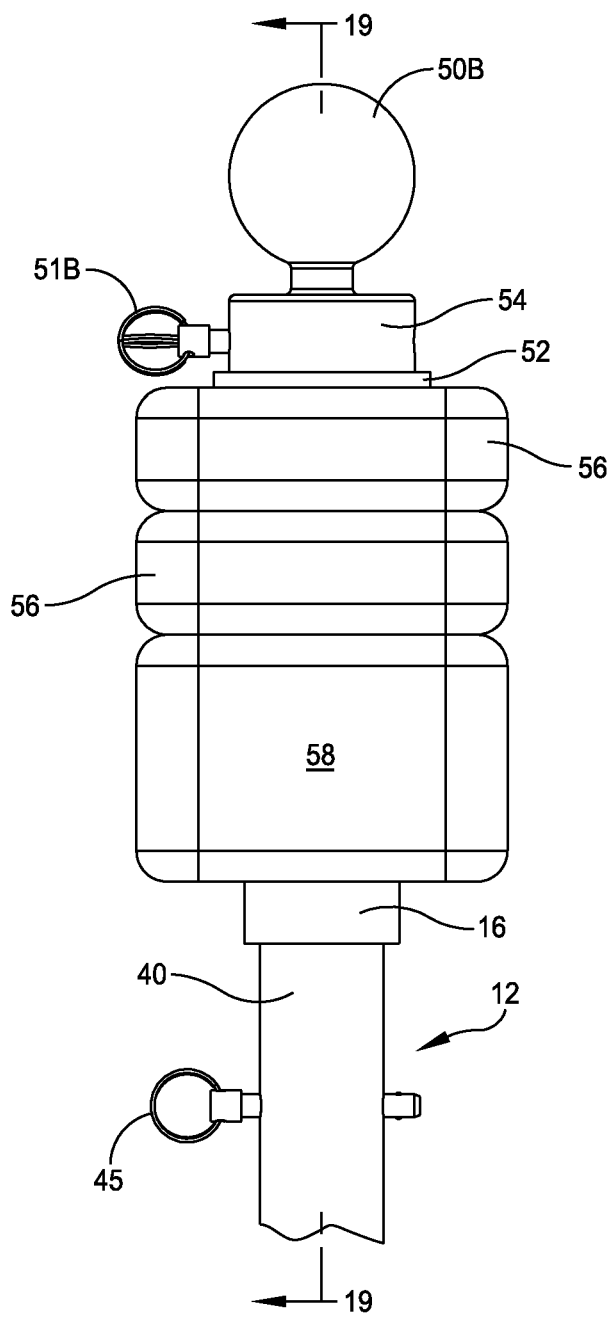
FIG. 18 is a fragmentary side elevation view of the device of FIG. 16.
Figure 19:
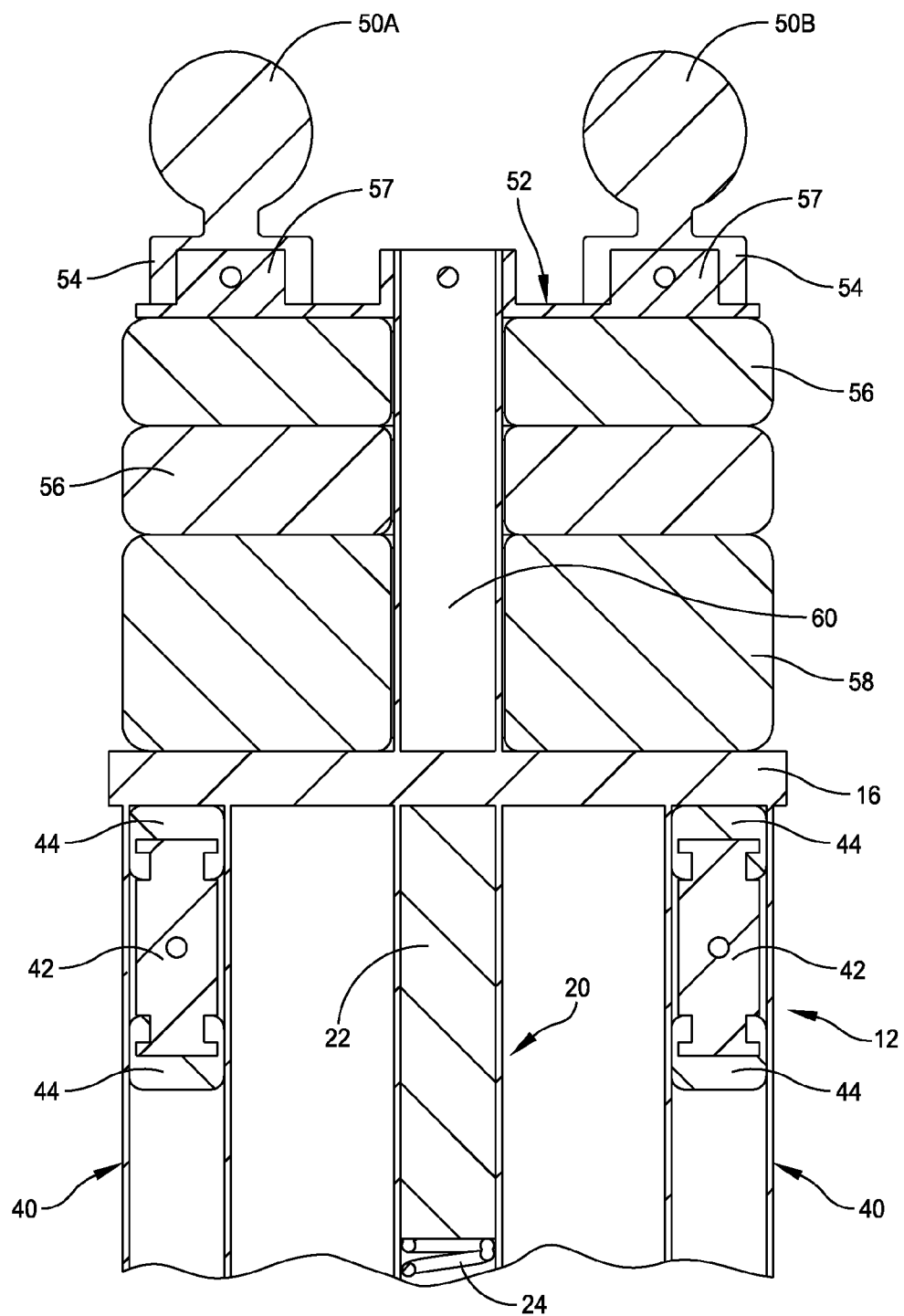
FIG. 19 is a cross-sectional view taken along line 19-19 of FIG. 18.
Figure 20:
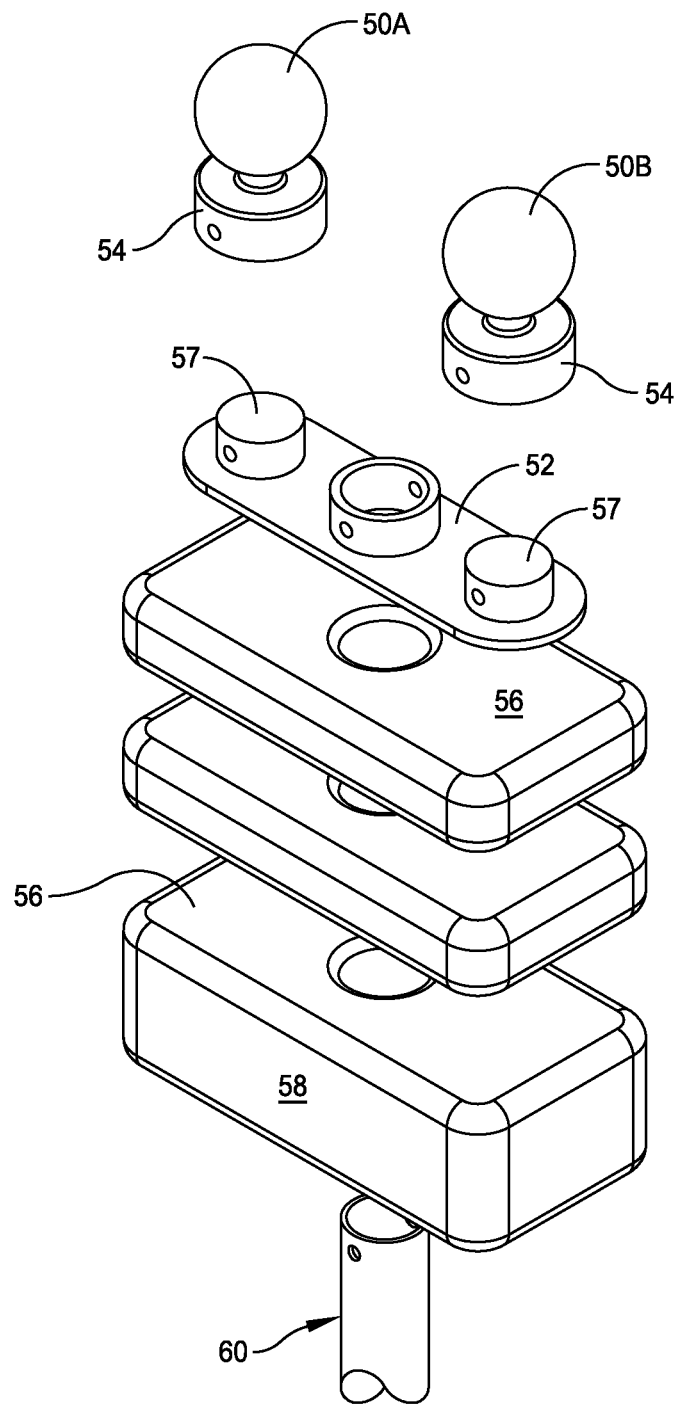
FIG. 20 is an exploded perspective view at the ball end of the device of FIG. 16.

A fourth embodiment of the present invention is illustrated in FIGS. 16-20. The FIG. 16 embodiment is substantially the same as shown in FIGS. 1-5 with the exception of the top part of the practice device. This includes the plates 14, 16; the tubular members 40; the tubular shaft 20; the mount 35; all the weights (42, 56); and a show structure. In FIG. 16 the simplest shoe structure is illustrated, although any of the show constructions may be used. The main difference in this fourth embodiment is the use of multiple ball members 50A, 50B. For this purpose the top plate 52 has multiple support posts 57 each receiving a base 54 of each ball member. Pins may be used to secure each ball member to its associated base. In the cross-sectional view of FIG. 19 a third post 57 is also shown although no ball is illustrated as supported at this center post.

The device of the present invention simulates the ability of a base for particularly releasing stunts. An example of these stunts includes, but is not limited to: Rewinds, Full-ups, Hand in hand with or without a pop through, full-around, hand stand ups, and more. The spring used in the device is meant to mimic the "flyer" jumping. On the initial toss one can start with a little bounce or during a dismount of a stunt it will recoil and act as a jumping mechanism. It will also be a feedback tool for coaches/instructors to see if the spring coils upon dismount/landing. This would allow the coaches to see if the "base" is catching his/her "flyer" correctly; helping to prevent any impact injuries of the flyer. The moving weight or weights in the tubes are to help with the rotational forces. These can be locked in place when someone who is not as advanced cannot handle the extra force; hence the use of pins that are illustrated in the drawings. The weights 56 and/or the spacer 58 may be in the form of one or more fill-able containers at the top that can be filled with sand, water, etc to give a different weight feel of a flyer. The containers can also be filled partially giving the "base" a more difficult time of finding center. It becomes a perturbation training tool; a way to work on stabilizer muscles during training. The device mimics a very difficult flyer. The device may be provided in different heights available to mimic the height of shorter and taller flyers. This device can be used in a group setting or a single base setting. In the drawings, particularly FIG. 21, the base is shown holding the foot end. The user can also basically the same thrust using two hands on that foot as well as hold it that way with the ball end in hand. When the ball is in hand its like the "flyer" is in a Hand in hand position (handstand type stunt) which allows for the device to flip through, between ball end and shoe end.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A practice device for simulating a cheerleading stunt comprising:
   a frame that includes a base plate and a top plate;
   a tubular shaft that extends between the base and top plates;
   a weight that is disposed in the tubular shaft;
   a spring that is disposed in the tubular shaft and that contacts and biases the weight;
   a shoe structure; and
   a mount that supports the shoe structure at one end thereof and that is constructed and arranged to be disposed within the tubular shaft with the spring disposed between the weight and the mount.

2. The practice device of claim 1 wherein the frame also includes a pair of tubular members that also extend between the base and top plates with the tubular shaft being disposed at an intermediate position of the base and top plates and the respective tubular members being disposed at opposed sides of the base and top plates.

3. The practice device of claim 2 including further weights that are each disposed in respective tubular members.

4. The practice device of claim 3 wherein the further weights are adjustable as to their position in the tubular member and each include a bumper at each end thereof.

5. The practice device of claim 1 including a grasping ball disposed over the top plate of the frame.

6. The practice device of claim 5 including at least one additional weight that is arranged over the top plate of the frame, and a support rod for retaining the at least one additional weight and having the grasping ball supported at a top end thereof.

7. The practice device of claim 6 including at least two additional weights stacked against each other.

8. The practice device of claim 1 wherein the frame also includes a pair of tubular members that also extend between the base and top plates with the tubular shaft being disposed at an intermediate position of the base and top plates and the respective tubular members being disposed at opposed sides of the base and top plates; including further weights that are each disposed in respective tubular members; wherein the further weights are adjustable as to their position in the tubular member and each include a bumper at each end thereof; including a grasping ball disposed over the top plate of the frame; including at least one additional weight that is arranged over the top plate of the frame, and a support rod for retaining the at least one additional weight and having the grasping ball supported at a top end thereof.

9. A practice device for simulating a cheerleading stunt comprising:
   a frame that includes a base plate and a top plate;
   a tubular shaft that extends between the base and top plates;
   a weight and spring combination that is disposed in the tubular shaft;
   a shoe structure;
   a mount that supports the shoe structure from a base end of the tubular shaft; and
   a grasping ball supported from and disposed over the frame;
   a user of the practice device having the capability of supporting the practice device overhead by holding in the hand either the grasping ball or the shoe structure.

10. The practice device of claim 8 wherein the weight and spring combination is constructed and arranged to be disposed within the tubular shaft with the spring disposed between the weight and the mount.

11. The practice device of claim 8 wherein the frame also includes a pair of tubular members that also extend between the base and top plates with the tubular shaft being disposed at an intermediate position of the base and top plates and the respective tubular members being disposed at opposed sides of the base and top plates.

12. The practice device of claim 10 including further weights that are each disposed in respective tubular members.

13. The practice device of claim 11 wherein the further weights are adjustable as to their position in the tubular member and each include a bumper at each end thereof.

14. The practice device of claim 8 including at least one additional weight that is arranged over the top plate of the frame, and a support rod for retaining the at least one additional weight and having the grasping ball supported at a top end thereof.

15. The practice device of claim 13 including at least two additional weights stacked against each other.

16. The practice device of claim 8 wherein the weight and spring combination is constructed and arranged to be disposed within the tubular shaft with the spring disposed between the weight and the mount; wherein the frame also includes a pair of tubular members that also extend between the base and top plates with the tubular shaft being disposed at an intermediate position of the base and top plates and the respective tubular members being disposed at opposed sides of the base and top plates; including further weights that are each disposed in respective tubular members; wherein the further weights are adjustable as to their position in the tubular member and each include a bumper at each end thereof; including at least one additional weight that is arranged over the top plate of the frame, and a support rod for retaining the at least one additional weight and having the grasping ball supported at a top end thereof.

17. A method for practicing the simulation of a cheerleading stunt comprising, providing a practice device that includes a frame supporting a grasping ball at one end thereof, supporting a shoe structure at an opposed end thereof and a biased weight disposed adjacent the opposed end of the frame, said practice device being operated by a user to, in one position thereof, engage the grasping ball to lift the practice device, and, in another position, to engage the shoe structure to lift the practice device.

18. The method of claim 17 wherein the biased weight provides a resistance to simulate the lifting of a cheerleader in performing a cheerleading stunt.

19. The practice device of claim 18 including providing the frame with base and top plates and a tubular shaft that is disposed between the base and top plates, the biased weight being constructed and arranged to slide within the tubular shaft to shift the weight distribution in the practice device.

20. The practice device of claim 18 including adding additional weight over the frame.

\* \* \* \* \*